C. Marsh 2nd.
Cracker Mach.
Nº 96715.   Patented Nov. 9 1869.

Witnesses.
Hugo Vogel
Lewis Myers

Inventor.
Cyrus Marsh 2d
pr Saml. S. Boyd
Atty

Sheet 2. 2 Sheets.

C. Marsh 2nd.
Cracker Mach.

Nº 96715.    Patented Nov. 9. 1869.

Witnesses.
Hugo Vogel
Lewis Myers

Inventor.
Cyrus Marsh 2d
pr Sam'l S. Boyd
Atty

UNITED STATES PATENT OFFICE.

CYRUS MARSH, 2D, OF NATCHEZ, MISSISSIPPI.

IMPROVED CRACKER-MACHINE.

Specification forming part of Letters Patent No. 96,715, dated November 9, 1869.

*To all whom it may concern:*

Be it known that I, CYRUS MARSH, 2d, of Natchez, in the county of Adams and State of Mississippi, have invented a new and useful Improved Cracker-Machine, of which the following is a full, clear, and exact description, reference being had to the annexed drawing, making a part of this specification, in which—

Figure 1:
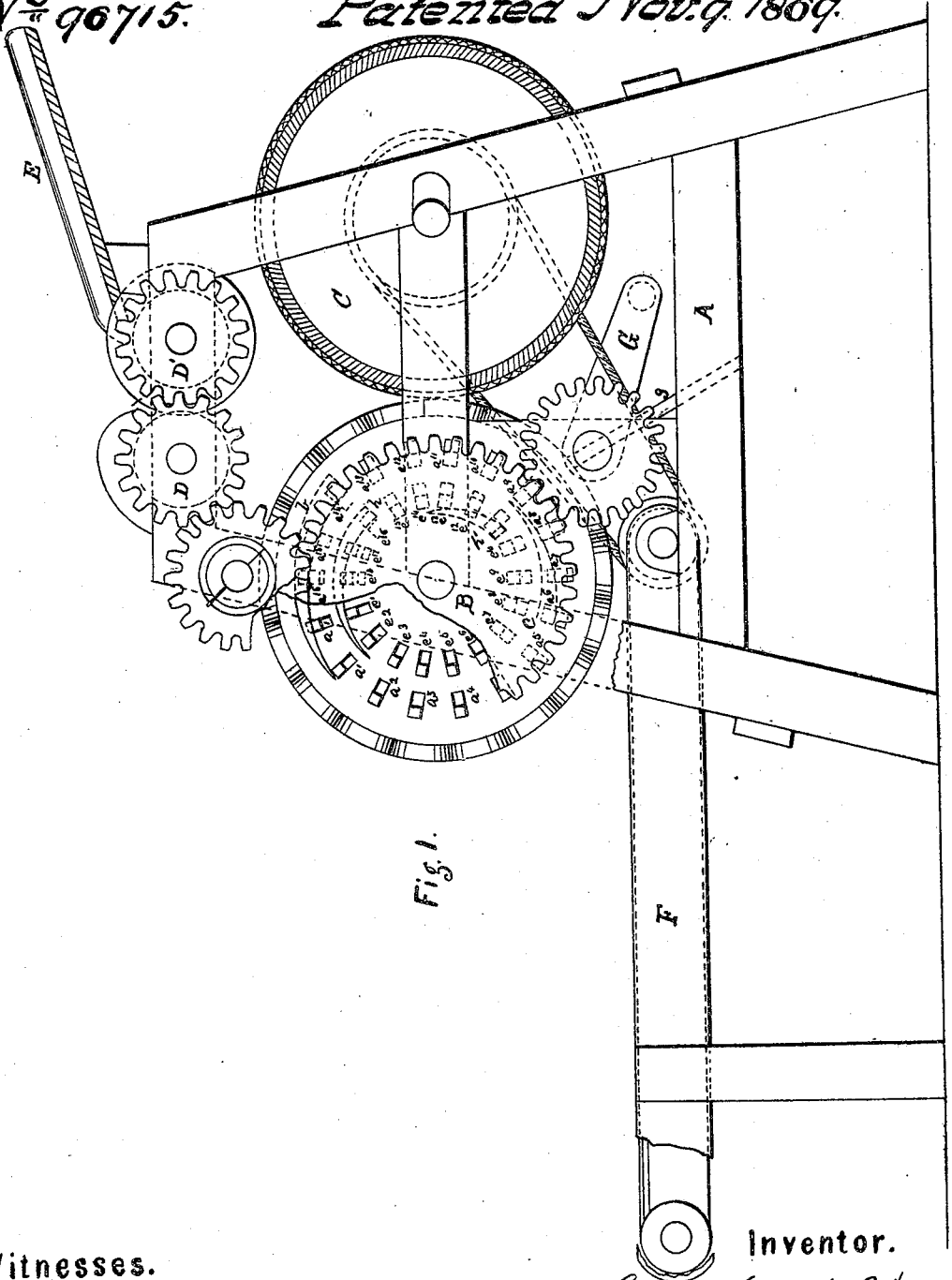
Figure 2:
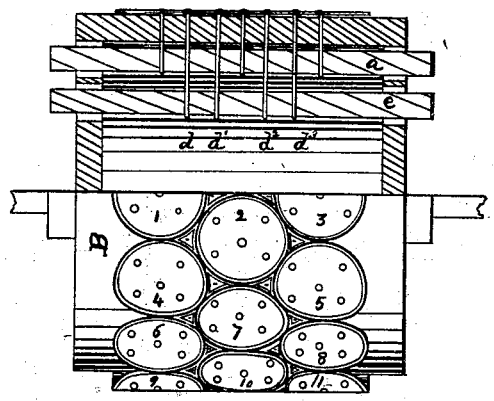
Figure 3:
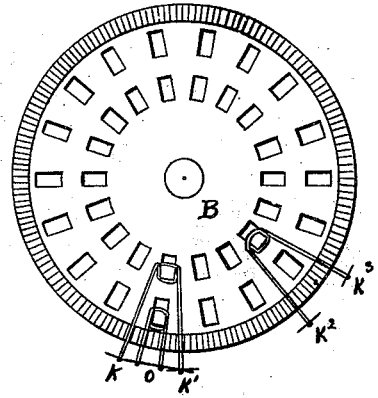
Figure 4:
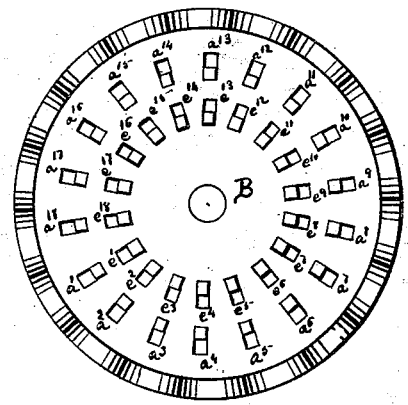

Figure 1 represents a side view of my invention with a portion broken out. Fig. 2 represents a detached view of the stamping-cylinder with a portion in section. Fig. 3 represents a vertical section of same without the cutters. Fig. 4 represents an end view of same.

Similar letters indicate like parts.

My invention is an improvement on the machine heretofore patented by me on the 24th July, 1860, and numbered 29,295, and has the same frame-work A supporting a stamping-cylinder, B, having on its periphery a series of cutters or formers, a pressure-cylinder, C, and horizontal rollers D D', having a chute, F, above them, down which the dough passes, between the rollers, and thence between the pressure and stamping-cylinders, and an apron or carrier, F, to receive the crackers, the whole being operated by the crank G, connected by a belt with C, and gearing with the spur-wheel of B, which communicates motion by a pinion to D, and this latter to D', as plainly seen in Fig. 1.

In my old machine the crackers were separated and disconnected, when discharged from the formers on B, onto the apron F, which rendered them troublesome to handle, as the "peel" could not be used with advantage; also, the scrap was much too great in quantity, on account of the formers being arranged in parallel lines.

The object I have now in view is to remedy these defects, by decreasing the amount of scrap, and to deposit the crackers on the apron all united together.

Instead of arranging the cutters in parallel lines, with spaces between them, for the action of the fingers of my old machine, I do away entirely with these fingers, and arrange the cutters as closely together as possible, so that their edges meet at several points, as plainly seen in the cutters 1 2 3, &c., Fig. 2.

At each point of contact, as seen in Fig. 2, the edges of the cutters are notched so that when they are pressed upon the dough there may be left a small connecting-link of dough uniting all the crackers in one mass, when deposited on the apron. These notches are not shown, but their formation and position may readily be understood from the parts shown in Fig. 2. These cutters 1 2 3, &c., Fig. 2, have followers, as in the old machine, connected by rods to a transverse bar passing through the stamping-cylinder B, as seen at $a$, Fig. 2, $a^1$ $a^2$, &c., Figs. 1 and 4, this bar sliding in slots, as plainly seen in the same figures.

As the cylinder B revolves these bars are, by the action of the cam $b$, Fig. 1, drawn down, so as to allow the cutters to fill with dough, and then, by the action of the cam $c$ on the bars, the followers are forced out, depositing the crackers on the apron, the cams being so arranged as to insure the proper motion at the proper time.

Now, it is evident that in this machine the scrap will be in the form of triangles between the cutters. In order to remove this I have a series of triangular followers to fill the spaces between the cutters, and, by means of rods $d$ $d^1$ $d^2$ $d^3$, Fig. 2, I connect them with a series of transverse bars, $e$, Fig. 2, similar to those already mentioned, but placed beneath them, as seen, and, working in slots in B.

A cam, $h$, Fig. 1, draws down these followers as B revolves, allowing them to fill with dough; but before the crackers are thrown on the apron F, a second cam, $h'$, actuates the bar, forcing the followers out, and depositing the scrap on the chute $g$. This chute also has fingers (not shown) on either side of the formers, so that the scrap, if any, on the outer edges may be removed.

Of course there are cams on the opposite side of the apparatus (not shown) corresponding to $h$ $h'$ and $b$ $c$. These triangular followers and their connections are plainly shown at $k$ $k^1$ $k^2$ $k^3$, Fig. 3, and at $o$, in the same figure, is seen the follower of the cutter with its connections.

What I claim as my invention, and desire to secure by Letters Patent, is—

The triangular followers $k$ $k^1$, &c., with their connecting-rods $d$ $d^1$, &c., bars $e$, &c., and operating-cams $h$ $h'$, &c., arranged for the purpose of removing the scrap between the cutters, disposed as shown, and constructed and operating substantially as described.

CYRUS MARSH, 2D.

Witnesses:
T. E. OWENS,
S. L. GIBSON.